US011338241B2

(12) United States Patent
Gaikwad et al.

(10) Patent No.: US 11,338,241 B2
(45) Date of Patent: May 24, 2022

(54) DIAGNOSTIC BREATHER DRYER

(71) Applicant: DES-CASE CORPORATION, Goodlettsville, TN (US)

(72) Inventors: Nikhil Rajkumar Gaikwad, Goodlettsville, TN (US); Jonathan Lee Haworth, Hendersonville, TN (US); Jay Michael Cooper, Nashville, TN (US); Eric Cooper Pride, Nashville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 57 days.

(21) Appl. No.: 16/679,907

(22) Filed: Nov. 11, 2019

(65) Prior Publication Data
US 2020/0070084 A1 Mar. 5, 2020

Related U.S. Application Data

(60) Continuation-in-part of application No. 16/283,323, filed on Feb. 22, 2019, which is a continuation of (Continued)

(51) Int. Cl.
*B01D 53/26* (2006.01)
*B01D 53/04* (2006.01)

(52) U.S. Cl.
CPC ..... *B01D 53/0454* (2013.01); *B01D 53/0407* (2013.01); *B01D 53/0415* (2013.01);
(Continued)

(58) Field of Classification Search
CPC ............ B01D 53/0407; B01D 53/0415; B01D 53/0454; B01D 53/261; B01D 2253/102;
(Continued)

(56) References Cited

U.S. PATENT DOCUMENTS 4,125,469 A * 11/1978 Henton .................. B01D 35/15
210/136
4,320,000 A * 3/1982 Lange .................... B01D 15/00
210/117
(Continued)

FOREIGN PATENT DOCUMENTS

CN 104747756 A 7/2015
JP 2010188246 A 9/2010
(Continued)

OTHER PUBLICATIONS

International Search Report and Written Opinion of corresponding PCT/US2019/060718, dated Aug. 11, 2020, 11 pages.

*Primary Examiner* — Frank M Lawrence, Jr.
(74) *Attorney, Agent, or Firm* — Patterson Intellectual Property Law, P.C.; Ryan D. Levy

(57) ABSTRACT

Apparatuses, systems, and methods are provided for a breather for a reservoir is provided, including a housing including a plurality of valves, the plurality of valves including (i) at least one valve in a first configuration configured to permit fluid communication from an interior portion of the housing with air outside the reservoir, and (ii) at least one valve in a second configuration configured to permit air to selectively pass between outside the breather and an interior portion of the breather. The breather further includes a plurality of first openings in the housing configured to be in fluid communication with air outside of the reservoir, a second opening of the housing configured to be in fluid communication with air inside the reservoir, and desiccant positioned within the housing.

10 Claims, 8 Drawing Sheets

Related U.S. Application Data application No. 15/260,367, filed on Sep. 9, 2016, now Pat. No. 10,213,725, which is a division of application No. 14/046,600, filed on Oct. 4, 2013, now Pat. No. 10,226,732.

(60) Provisional application No. 61/709,360, filed on Oct. 4, 2012.

(52) U.S. Cl.
CPC ...... B01D 53/261 (2013.01); *B01D 2253/102* (2013.01); *B01D 2253/104* (2013.01); *B01D 2253/106* (2013.01); *B01D 2253/116* (2013.01); *B01D 2257/80* (2013.01)

(58) Field of Classification Search
CPC ........ B01D 2253/104; B01D 2253/106; B01D 2253/116; B01D 2257/80; B01D 2259/40003; B01D 2259/40009
USPC ........ 95/8, 10, 14, 15, 19; 96/109, 111, 112, 96/113; 55/DIG. 19
See application file for complete search history.

(56) References Cited

U.S. PATENT DOCUMENTS

| | | | | |
|---|---|---|---|---|
| 4,504,289 A | * | 3/1985 | Waller | B01D 53/261 96/138 |
| 5,580,451 A | * | 12/1996 | Tack | B01D 15/00 210/266 |
| 5,902,381 A | * | 5/1999 | Golner | B01D 53/261 96/146 |
| 6,217,639 B1 | * | 4/2001 | Jackson | B01D 53/0415 55/385.4 |
| 6,235,192 B1 | * | 5/2001 | Melfi | B01D 35/15 137/856 |
| 6,361,574 B1 | * | 3/2002 | Decker | B01D 46/0024 55/317 |
| 6,558,457 B1 | * | 5/2003 | Kolczyk | B01D 53/261 55/318 |
| 8,216,350 B2 | | 7/2012 | Honjo et al. | |
| 10,213,725 B2 | * | 2/2019 | Gaikwad | B01D 53/0407 |
| 2001/0025484 A1 | * | 10/2001 | Ueno | F01N 11/00 60/277 |
| 2005/0103195 A1 | * | 5/2005 | Golner | B01D 53/0454 96/111 |
| 2013/0340619 A1 | * | 12/2013 | Tammera | B01D 53/047 96/121 |
| 2014/0165827 A1 | * | 6/2014 | Gaikwad | B01D 53/0454 95/25 |

FOREIGN PATENT DOCUMENTS

| | | |
|---|---|---|
| KR | 1020170031316 A | 3/2017 |
| WO | 2012079116 A1 | 6/2012 |

\* cited by examiner

DIAGNOSTIC BREATHER DRYER

CROSS-REFERENCES TO RELATED APPLICATIONS

This application is a continuation-in-part application of U.S. patent application Ser. No. 16/283,323 filed Feb. 22, 2019, entitled "Diagnostic Breather Device," which is a continuation application of U.S. patent application Ser. No. 15/260,367 filed Sep. 9, 2016, entitled "Diagnostic Breather Dryer," which is a divisional application of U.S. patent application Ser. No. 14/046,600 filed Oct. 4, 2013, entitled "Diagnostic Breather Dryer," which claims benefit of U.S. Provisional Patent Application No. 61/709,360 filed Oct. 4, 2012, entitled "Breather Dryer with Indicator," each of which is incorporated by reference in its entirety.

We, Nikhil Rajkumar Gaikwad, residing in Goodlettsville, Tenn. Jonathan Lee Haworth, residing in Hendersonville, Tenn., Jay Michael Cooper, residing in Nashville, Tenn. and Eric Cooper Pride, residing in Nashville, Tenn. have invented a new and useful "DIAGNOSTIC BREATHER DRYER."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to breathers for liquid reservoirs. More particularly, the present invention relates to humidity controlling breathers for liquid reservoirs.

Breathers allow for expansion of liquids and gases (e.g., air) in liquid (e.g., lubricant) reservoirs while preventing contamination of the liquid. For liquid reservoirs such as engine crank cases and lubricant storage reservoirs, water vapor and dust particles in the air can be pulled into the liquid by the expansion and contraction action of the air and liquid in the reservoir with changes in temperature or barometric pressure of the surrounding environment and the contents of the reservoir (i.e., fluid level changes in the reservoir). Currently, breathers are replaced on a schedule, whether the breathers are at the end of their useful life or not because it is difficult to tell when a breather has reached the end of its useful life. Alternatively, breathers utilize color changing desiccants to indicate when the breather has reached the end of its useful life and needs replacement. The color changing desiccants require transparent breather housings which are generally weaker than opaque breather housings, present chemical incompatibility issues, and the chemicals used to change color may be considered toxic under some guidelines. Further, the color change may be faint, difficult to see depending on the location and environment of the reservoir and breather, and therefore difficult to interpret. For example, breather dryers (e.g., desiccant breathers) are commonly mounted on lubricating fluid reservoirs in large format wind turbines. The nacelles in these turbines are typically cramped and include many poorly lit, hard to reach areas near lubrication reservoirs where breathers are located. Visibility of the breather and any color change is therefore difficult to see. Additionally, the nacelle may typically only be accessed when the wind turbine is shut down (i.e., stopped and not generating power).

BRIEF SUMMARY OF THE INVENTION

Aspects of the present invention provide a breather apparatus with desiccant therein.

In one aspect, a breather for a reservoir is provided, including a housing including a plurality of valves, the plurality of valves including (i) at least one valve in a first configuration configured to permit fluid communication from an interior portion of the housing with air outside the reservoir, and (ii) at least one valve in a second configuration configured to permit air to selectively pass between outside the breather and an interior portion of the breather. The breather further includes a plurality of first openings in the housing configured to be in fluid communication with air outside of the reservoir, a second opening of the housing configured to be in fluid communication with air inside the reservoir, and desiccant positioned within the housing.

In another aspect, a breather for a reservoir includes a housing including a plurality of first openings in the housing configured to be in fluid communication with air outside of the reservoir, and a plurality of vent plugs configured to be coupleable to at least one of the plurality of first openings. The breather may include a second opening of the housing configured to be in fluid communication with air inside the reservoir, desiccant positioned within the housing, and a cap including a valley therein configured to correspond to a lip at a top portion of the housing to form a seal when placed in contact, the cap having a domed exterior surface.

In a further aspect, a breather for a reservoir includes a housing, a plurality of first openings in the housing configured to be in fluid communication with air outside of the reservoir, a second opening of the housing configured to be in fluid communication with air inside the reservoir, desiccant positioned within the housing, a humidity sensor positioned within the housing, wherein the humidity sensor is operable to provide a humidity signal indicative of a humidity level adjacent to the humidity sensor, and a controller communicatively coupled to the humidity sensor, wherein the controller is operable to determine an end of life condition of the breather based at least in part upon the humidity signal.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
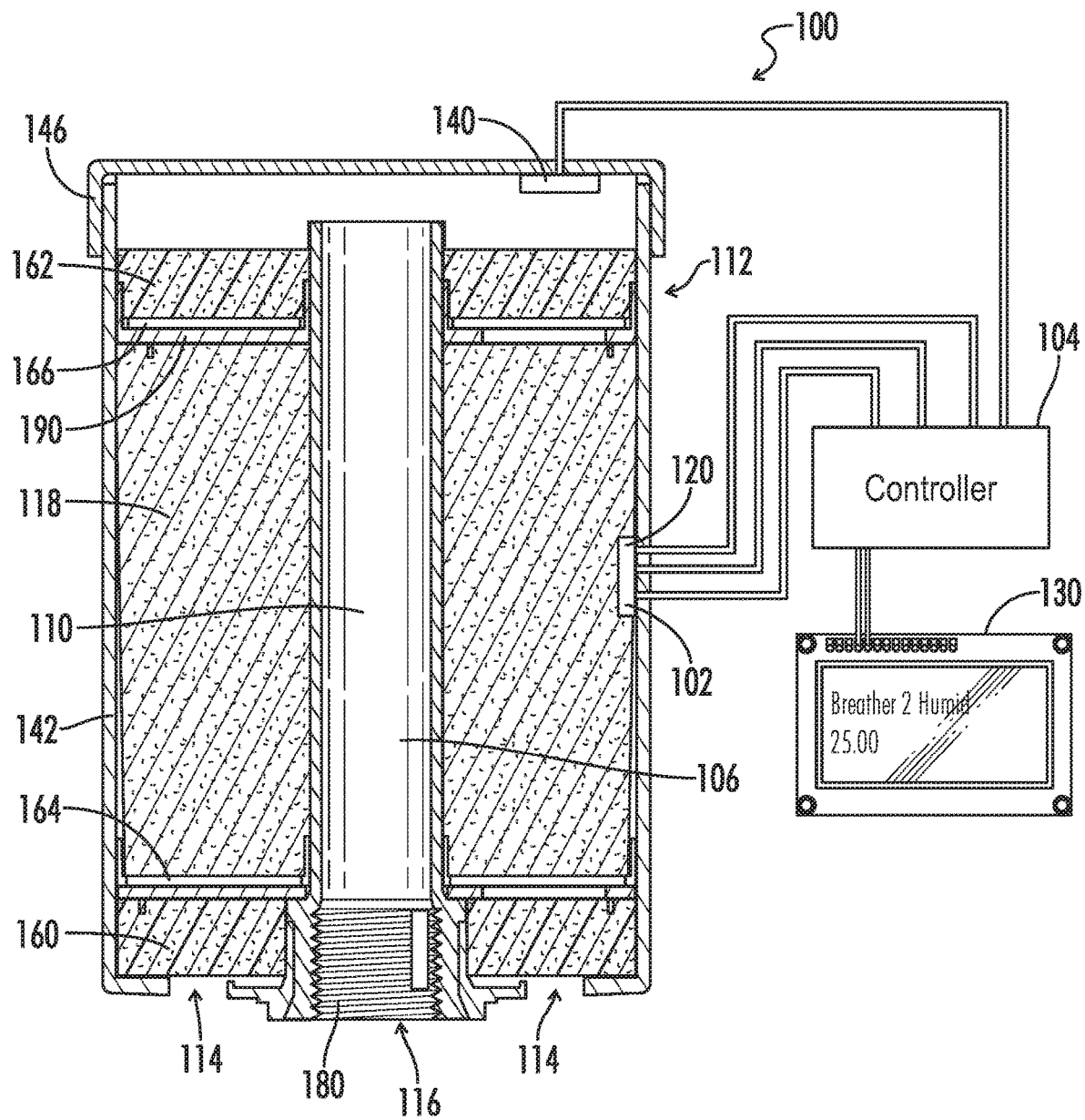
FIG. 1 illustrates a side cutaway view of an exemplary embodiment of a breather having a humidity sensor according to aspects of the present disclosure.

Referring to FIG. 1, a breather 100 for a reservoir includes a housing 112, a first opening in the housing 114, a second opening in the housing 114, a desiccant 118, a humidity sensor 102, and a controller 104. The first opening in the housing 114 is configured to be in fluid communication with air outside of the reservoir. The second opening in the housing is configured to be in fluid communication with air inside the reservoir.

The desiccant 118 is positioned within the housing 112 such that air passing through the breather 100 from the outside to the inside of the reservoir must pass through the desiccant 118. Air passing from the outside to the inside of the reservoir may bypass the desiccant 118 or be routed through the desiccant 118.

The humidity sensor 102 is positioned within the housing 112. The humidity sensor 102 is operable to provide a humidity signal indicative of the humidity level adjacent the humidity sensor 102. In one embodiment, the breather 100 further includes a temperature sensor 120 associated with (e.g., positioned in or near) the housing 112. In one embodiment, the humidity sensor 102 is integral with the temperature sensor 120. The temperature sensor 120 is also electrically connected to the controller 104, and the temperature sensor 120 is operable to provide a temperature signal indicative of a temperature adjacent the temperature sensor 120 to the controller 104. In one embodiment, the housing 112 includes an adapter to locate the humidity sensor 102, pressure sensor 140, and/or temperature sensor 120 remote from a main portion of the housing 112.

The controller 104 is electrically connected to the humidity sensor 102. The controller 104 may be local to the housing 112 or remote from the housing 112. The controller 104 may be electrically connected to the humidity sensor 102 via a wired or wireless communications link. The communications link may be analog or digital. The controller 104 is operable to determine an end of life condition of the breather 100 as a function of the humidity signal received from the humidity sensor 102. In one embodiment, the controller 104 is operable to determine the end of life condition as a function of the humidity signal received from the humidity sensor 102 and the temperature sensor received from the temperature sensor 120. The controller 104 uses the temperature signal and the humidity signal to determine a relative humidity associated with the desiccant 118. In actual usage, the relative humidity stabilizes after initial installation of the breather 100 on the reservoir, and the breather 100 reaches the end of its useful life (i.e., end of life) when the relative humidity reaches a predetermined maximum relative humidity. In one embodiment, the relative humidity may stabilize at approximately 20 to 25% and increase generally linearly up to the maximum relative humidity (i.e., the relative humidity indicating end of life or end of useful life of the breather 100) of approximately 40%. In one embodiment, the controller 104 is operable to determine the end of life condition by determining an estimated time of life remaining or an estimated percentage of life remaining as a function of the determined relative humidity and a historical rate of change of the relative humidity calculated by the controller based on previous relative humidity calculations.

In one embodiment, the breather 100 further includes a display 130. The display 130 is electrically connected to the controller 104. The display 130 may be local to the controller 104 or remote from the controller 104. The electrical connection between the display 130 and the controller 104 may be wired or wireless, and may communicate data in an analog or digital format. The controller 104 is operable to provide an end of life signal indicative of the end of life status (i.e., end of life condition) determined by the controller 104. The display 130 is operable to receive the end of life signal from the controller 104 and display to an observer an indication of the end of life status of the breather 100 as a function of the received end of life signal. The end of life signal is indicative of at least one of a relative humidity value, a percentage of life remaining, and an estimated remaining time of life. The end of life status displayed by the display 130 includes the at least one relative humidity value, percentage of life remaining, or estimated remaining time of life indicated by the end of life signal provided by the controller 104.

In one embodiment, the breather 100 further includes a pressure sensor 140. The pressure sensor 140 is positioned within the housing 112 such that air passing through the breather 100 from the inside of the reservoir to the desiccant 118 must pass by the pressure sensor 140. The pressure sensor 140 is operable to provide a pressure signal indicative of an air pressure adjacent the pressure sensor 140 to the controller 104. The controller 104 is further configured to determine a fall condition when the pressure signal indicates that the air pressure adjacent the pressure sensor 140 is above a predetermined pressure limit. In operation, when this pressure is above the predetermined limit, it can be inferred that the airflow requirements of the reservoir have not been properly matched to an appropriately sized breather (i.e., a larger capacity breather should be used with the given reservoir), the breather 100 is improperly installed, or has reached particulate or humidity saturation (i.e., end of life or end of useful life) and is no longer effective. In one embodiment, the pressure sensor 140 is a differential pressure sensor comprising a first pressure sensor in fluid communication with the air inside the reservoir and a second pressure sensor in fluid communication with the air outside the reservoir. In this embodiment, when the differential pressure sensed by the pressure sensor 140 exceeds a predetermined limit, the controller 104 is operable to determine the fault condition and communicate the fault condition to the display 130 for display to an observer.

In one embodiment, the housing 112 includes a rigid or semi-rigid body 142 and a cap 146. The breather 100 has a foam bottom 160, a foam top 162, a particulate filter bottom 164, a particulate filter top 166, and a filter ring 190. A space between the foam top 162 and cap 146 defines a breather headspace 170. The foam top 162 is between the desiccant 118 and cap 146. The breather 100 includes a standpipe 110. The standpipe 110 has a standpipe bottom end 106 and a stand standpipe top end 108. The standpipe bottom end 106 includes a threaded section 180 operable to engage corresponding threads of the reservoir. In one embodiment, as shown in FIG. 1, the humidity sensor 102 is substantially surrounded by the desiccant 118. That is, the humidity sensor 102 is located within the desiccant 118. In another embodiment, the humidity sensor 102 is located within the breather cap headspace 170 of the breather 100. In one embodiment, the pressure sensor 140 is also included located within the breather cap headspace 170. In another embodiment, the humidity sensor 102 is located within the standpipe 110. It is contemplated that the humidity sensor 102 may be located within the desiccant 118, partially within desiccant 118 on the second opening 116 side of the desiccant 118 such that air has to flow past the humidity sensor 102 as it passes between the desiccant 118 and the second opening 116, or outside of the desiccant 118 on the second opening 116 side of the desiccant 118 such that air has to flow past the humidity sensor 102 as it passes between the desiccant 118 and the second opening 116. It is contemplated within the scope of the claims that the breather 100 may include any number of first openings 114 and any number of second openings 116. In embodiment, the first opening(s) 114 includes a 2-way, pressure limited check valve. The check valve reduces exposure of the desiccant 118 to the atmosphere to prolong the useful life of the desiccant 118 and thus breather 100. The pressure limit prevents small fluctuations in pressure in the reservoir from drawing air through the desiccant 118 while allowing larger, less transient pressure changes to draw air through the desiccant 118 and maintain the proper pressure in the reservoir (e.g., approximately atmospheric or environmental pressure). In one embodiment, the check valve is limited at 0.2 psi in either direction.

During out-breathing, as moisturized air from the reservoir headspace enters the standpipe bottom side 106 and flows upward in to the breather headspace 170. The air then passes through the foam filter top 162 and particulate filter 166 to remove the dust particles over 3 microns out of the air. The air then passes through the desiccant 118 where moisture gets absorbed or adsorbed from the air.

During in-breathing, breather 100 draws air from the surrounding space in through the first opening 114. This air first comes through the bottom foam filter 160, then the bottom particulate filter 164 where particles over 3 microns are removed. The air then passes through the desiccant 118 where moisture is absorbed or adsorbed by the desiccant 118, and clean, dry air enters in to the top side of standpipe 108, where it can flow into the reservoir headspace.

In one embodiment, the initial installation of the breather 100 on the reservoir includes removing the breather 100 from packaging, attaching the breather 102 threads of the reservoir corresponding to the threaded portion 180 of the standpipe 110, and providing power to the controller 104. Following initial installation, as desiccant 118 absorbs or adsorbs moisture from the reservoir headspace and relative humidity in the reservoir headspace and breather 100 decrease. In one embodiment, the controller 104 is configured to ignore the humidity signal from the humidity sensor 102 until the humidity signal indicates that the humidity level adjacent the humidity sensor 102 has decreased below a predetermined maximum humidity level. In one embodiment, the predetermined maximum humidity level is a relative humidity level, and the controller 104 determines that the humidity level adjacent the humidity sensor 102 has decreased below the predetermined maximum humidity level as a function of both the temperature signal provided by the temperature sensor 120 and the humidity signal provided by the humidity sensor 102. In another embodiment, the controller 104 is configured to ignore the humidity signal for a predetermined period of time after initial installation of the breather 100 on the reservoir to allow the humidity adjacent the humidity sensor 102 to drop below the predetermined maximum humidity level. As continuous in-breathing and out-breathing of the air continues, desiccant 118 gradually reaches its full saturation capacity and will no longer absorb or adsorb the moisture out of the air passing therethrough. This allows moisturized air pass through and flow in and out of the tank headspace if the breather 100 is not replaced.

Figure 2:
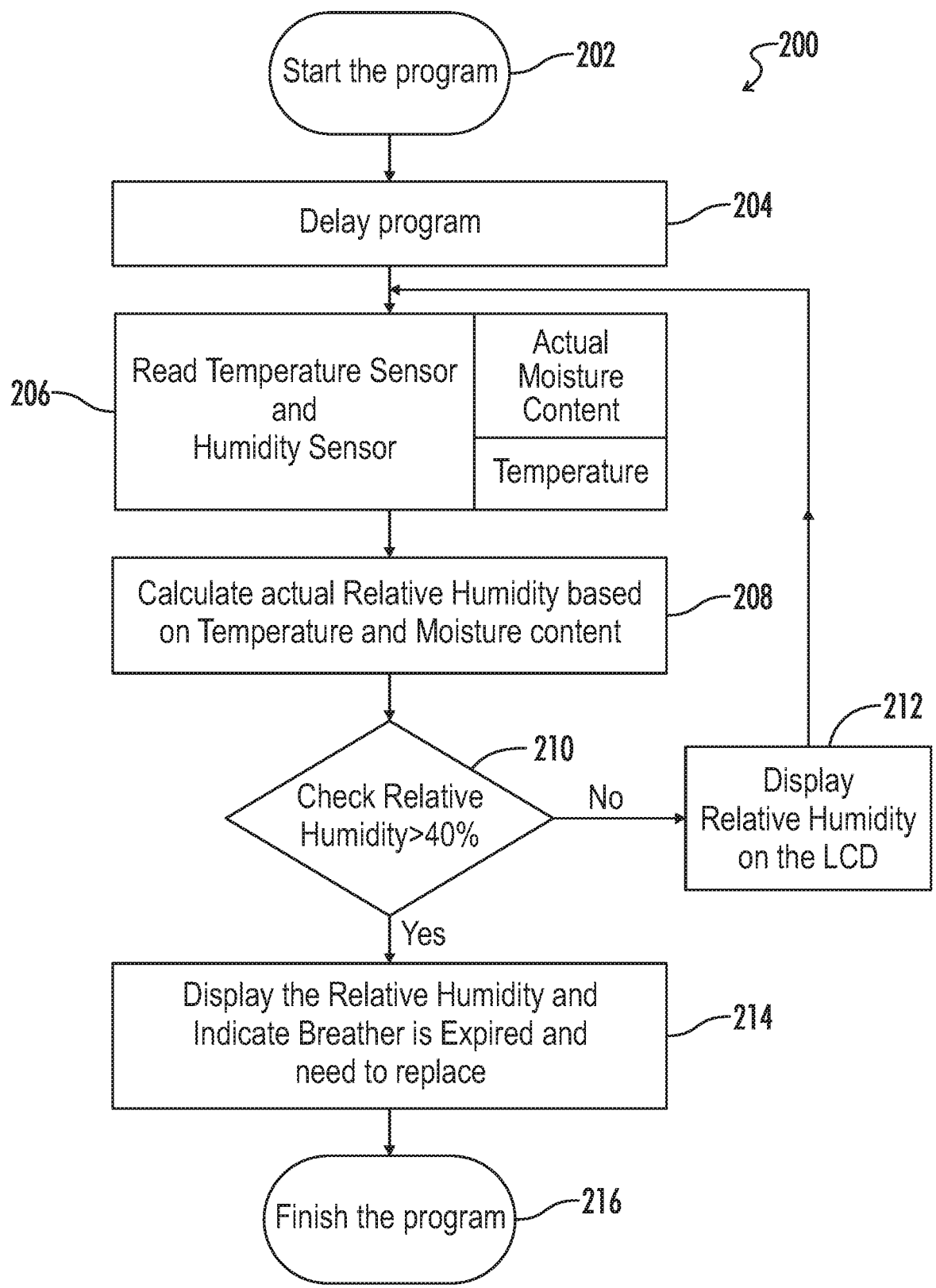
FIG. 2 is a flow chart of an exemplary embodiment of a method of determining an end of life condition of a breather according to aspects of the present disclosure.

Referring to FIG. 2, a method 200 of determining an end of life condition of the breather 100 begins at 202 when the controller 104 receives power. At 204, the control delays program as a function of time or a calculator relative humidity as described above to allow the humidity inside the breather 100 to stabilize. In one embodiment, the controller 104 delays the start of the humidity sensor monitoring cycle for a predetermined period of time to allow the humidity in the reservoir and desiccant 118 to stabilize following installation of the breather 100 on the reservoir. It is contemplated within the scope of the claims that the delay may be more or less than 24 hours depending on the intended environment of the breather 100 including the system properties (e.g., volume of reservoir, headspace of reservoir, number of breathers, etc.). At 206, the controller 104 reads the temperature sensor 120 and the humidity sensor 102. At 208, the controller 104 calculates the actual relative humidity in the breather 100 based on the data read from the temperature sensor 120 and the humidity sensor 102. At 210, the controller 104 determines whether the relative humidity is greater than 40%. If the controller determines that the relative humidity is not greater than 40%, then the controller 104 provides the relative humidity to the display 130 (e.g., an LCD display) for display to an observer and again samples the temperature sensor 120 and the humidity sensor 102 at 206. If the controller 104 determines that the relative humidity is greater than 40% at 210, then the controller 104 senses the relative humidity to the display 134 display to an observer at 214. At 214, the controller 104 may also set an alarm or provide additional input to the display 130 indicating that the breather 100 has reached the end of its useful life. The method ends at 216 when the controller 104 ceases to receive power.

It is contemplated that the breather 100 disclosed herein may be used with reservoirs containing lubricating oils, hydraulic fluids, and special chemicals to protect those contents from moisture and particulate ingestion under virtually any condition in any application. It is also contemplated that the desiccant 118 may include Silica Gel (All Varieties); Activated Alumina; Molecular Sieve (All Varieties); Activated Carbon/Charcoal (All Varieties); Alumino Silcate gels: KC-Trockenperlen® N, KC-Trockenperlen® WS; Calcium Sulfate; ZR gel Grain (ZR, TI); Sodium Polyacrylate; Hygroscopic salts/deliquescent salts; and Glycols, or any combination thereof. In one embodiment, electronic components (e.g., the controller 104 and display 130) are encapsulated in moisture impermeable material (e.g., epoxy resin) to avoid particle contamination and premature failure.

Figure 3:
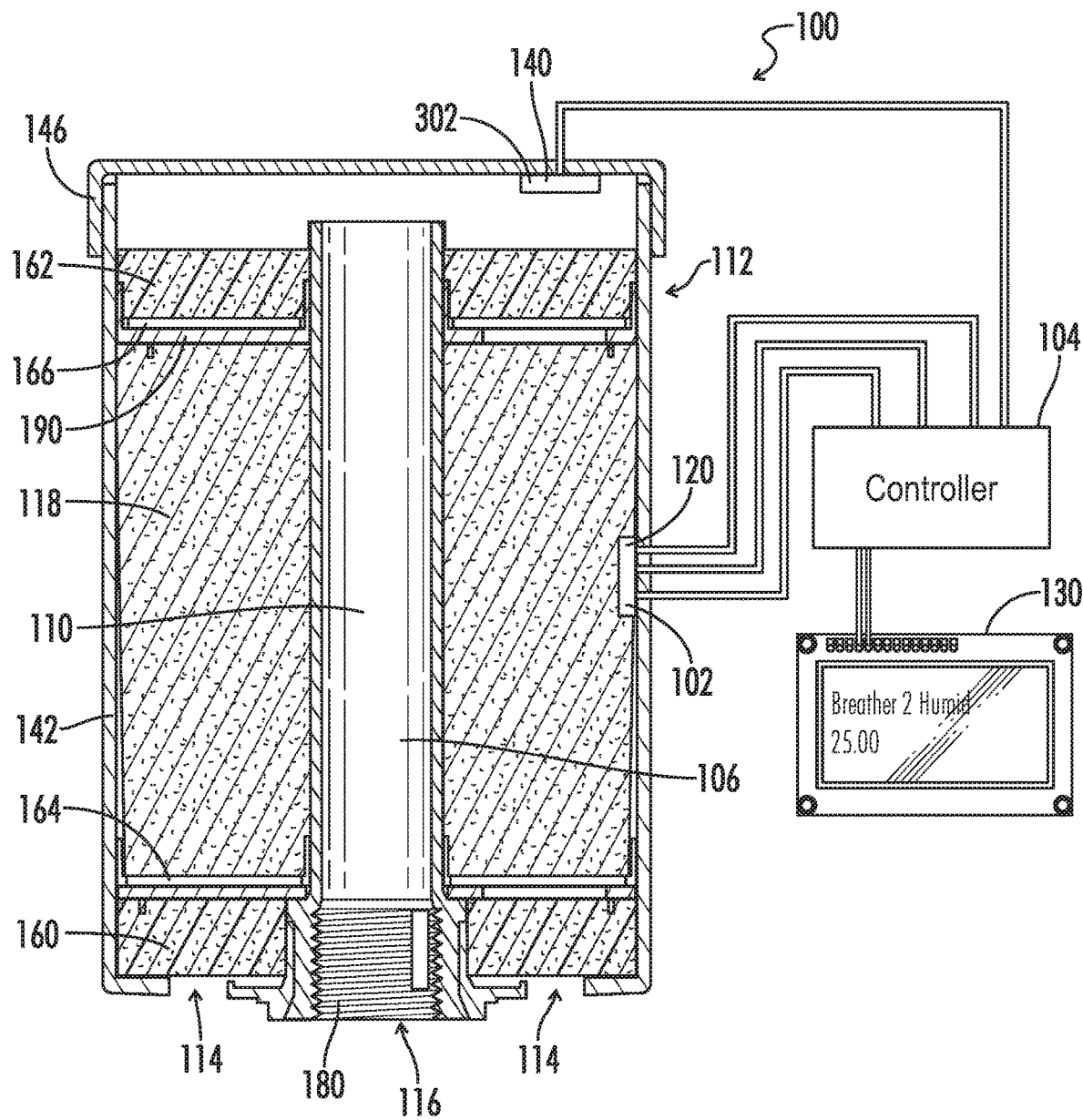
FIG. 3 is a side cutaway view of an exemplary embodiment of a breather having dual humidity sensors according to aspects of the present disclosure.

Referring to FIG. 3, in one embodiment, the breather 100 includes dual humidity sensors. The humidity sensor 102 is a first humidity sensor 102 positioned within the housing 112 and substantially surrounded by the desiccant 118. The first humidity sensor 102 is operable to provide a first humidity signal indicative of a first humidity level adjacent the first humidity sensor 102 to the controller 104.

A second humidity sensor 302 may be integral with the pressure sensor 140 and position within the housing 112 such that air passing through the breather 100 from the inside of the reservoir to the desiccant 118 and vice versa must pass by the second humidity sensor 302. The second humidity sensor 302 is operable to provide a second humidity signal indicative of a second humidity level adjacent the second humidity sensor to the controller 104. It is contemplated within the scope of the claims that the second humidity sensor 302 may be located within a thread adapter for adapting the threads of the threaded portion or section 180 of the housing 112 to threads of a corresponding section of the reservoir. In such an embodiment, the housing 112 is considered to include the thread adapter.

The controller 104 is electrically connected to both the first humidity sensor 102 and the second humidity sensor 302. The controller is operable to receive the first humidity signal from the first humidity sensor 102 and the second humidity signal from the second humidity sensor 302. The controller 104 is operable to determine an end of life condition of the breather 100 as a function of the first humidity signal and the second humidity signal. When the first humidity level indicated by the first humidity signal is approximately equal to or greater than the second humidity level indicated by the second humidity signal, the controller 104 operates normally as described above to determine the end of life condition by determining the relative humidity associated with the first humidity sensor 102.

In one embodiment, when the first humidity level indicated by the first humidity signal is less than the second humidity level indicated by the second humidity signal, the controller 104 can determine a fault condition. The first humidity level being less than the second humidity level indicates that the reservoir has not dried completely (i.e., the relative humidity at the second humidity sensor 302 is still trending downward after initial installation of the breather 100 on the reservoir) or that moisture is getting into the reservoir in some way. In one embodiment, the controller 104 differentiates between initial installation and moisture penetration into the reservoir as a function of the rate of decrease of the relative humidity at the second humidity sensor 302 and the time after initial installation (i.e. power up of the controller 104). That is, if the rate of decrease of the relative humidity of the second humidity sensor 302 decreases without a corresponding increase in the humidity at the first humidity sensor 102, then the controller 104 determines that there is water intrusion into the reservoir. In this embodiment, the controller 104 only determines the fault condition when the controller 104 determines that there is water intrusion into the reservoir.

In one embodiment, the determined end of life condition is another fault condition. The controller 104 determines a dewpoint as a function of the pressure signal from the pressure sensor 140 and the temperature signal from the temperature sensor 120. When the second humidity level adjacent the second humidity sensor 302 indicates that the second humidity level is greater than the dewpoint, the controller 104 determines the fault condition. In one embodiment, the controller 104 is operable to transmit fault conditions (i.e., end-of-life conditions) to remote terminals or displays 130.

Figure 4:
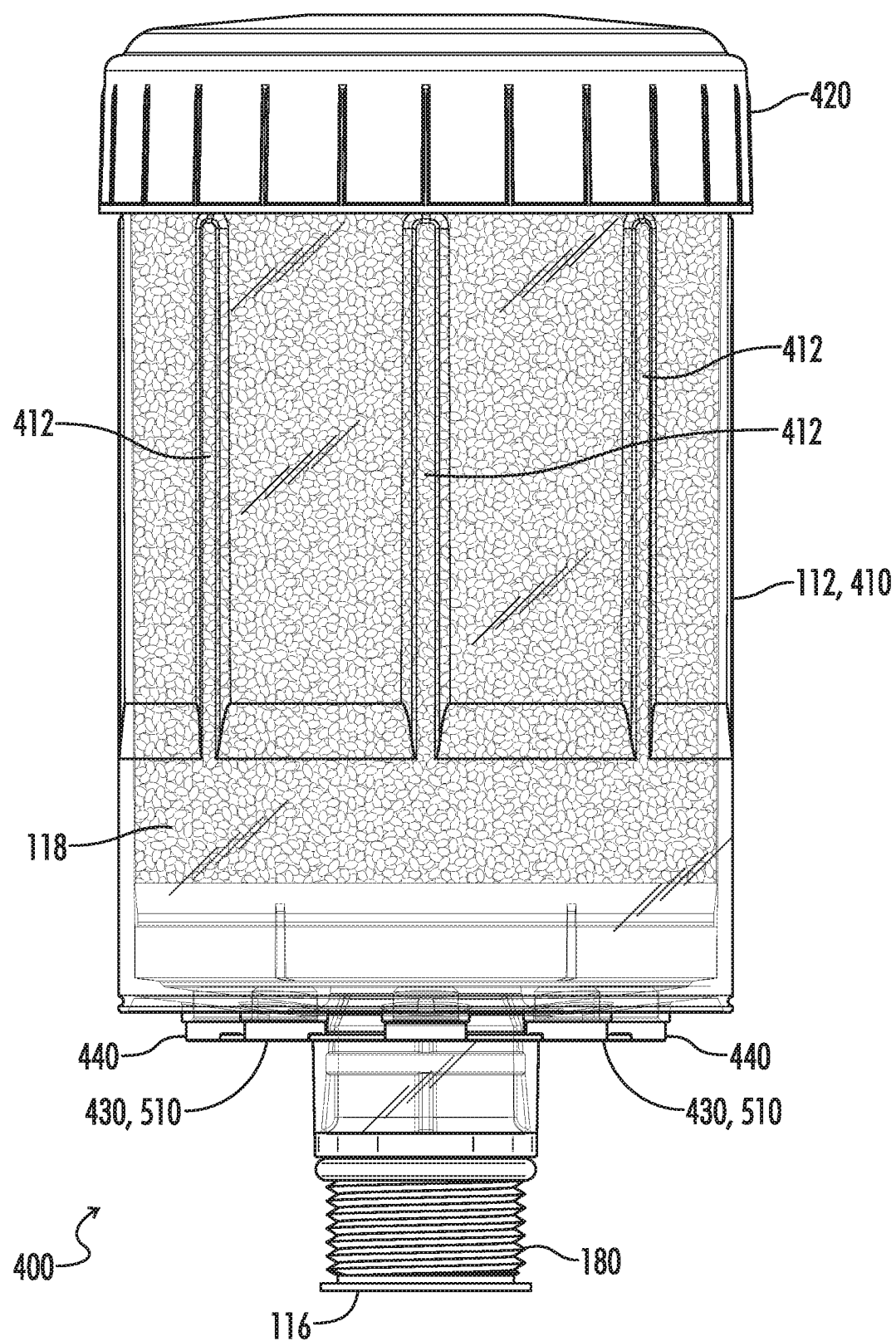
FIG. 4 illustrates an exemplary embodiment of a partial view of a breather according to aspects of the present disclosure.

FIG. 4 illustrates an exemplary embodiment of a partial view of a breather 400 according to aspects of the present disclosure. The breather 400 may include one or more components of the breather 100 described previously herein. The breather 400 may include a housing 410. The housing 410 may be equivalent to the housing 112 previously described herein in various embodiments. The housing 410 may include one or more ribs 412 around an outer surface of the housing 410. The ribs 412 may be formed by providing a recess or cavity of the outer surface of the housing 410 and may be used to provide a gripping surface, to increase structural integrity, and/or to reduce an overall material cost in various embodiments. The housing 410 may be configured to contain one or more elements there, such as a desiccant 118.

The breather 400 may include a cap 420 at an exterior surface of the breather 410, for example at a top surface of the housing 410. The cap 420 may be equivalent to the previously described cap 146 in various embodiments. In various embodiments, the cap 146, 420 may be removably coupleable to the breather 100, 400, 800, for example via a valley at an interior portion of the cap 146, 420 with a lip or other external surface of the housing of the breather 100, 400, 800 as described below with reference to FIG. 10. Although illustrated at a top surface of the housing 410 it should be appreciated that at least a portion of a cap 420 may be placed at any outer surface of the housing 410 without departing from the spirit and scope of the present disclosure. Additional features of the cap 420 are described below with reference to FIG. 9.

The breather 400 may include at least one first opening 430. The at least one first opening 430 may be equivalent, in various embodiments, to the first opening 114 previously described herein. The first opening 430 in the housing 410 may be configured to be in fluid communication with air outside of the reservoir depending upon a status of a vent plug 440 coupleable thereto. At least one vent plug 440 may be configured to permit fluid communication from an interior portion of the housing 410 of the breather 100, 400, 800 with air outside of the breather 100, 400, 800. At least one vent plug 440 may be optionally configured to permit fluid communication between air outside of the breather 100, 400, 800 and an interior portion of the housing 410 of the breather 100, 400, 800. The breather 400 may further include a threaded section 180 and a second opening 116 as previously described with reference to FIG. 1.

Figure 5:
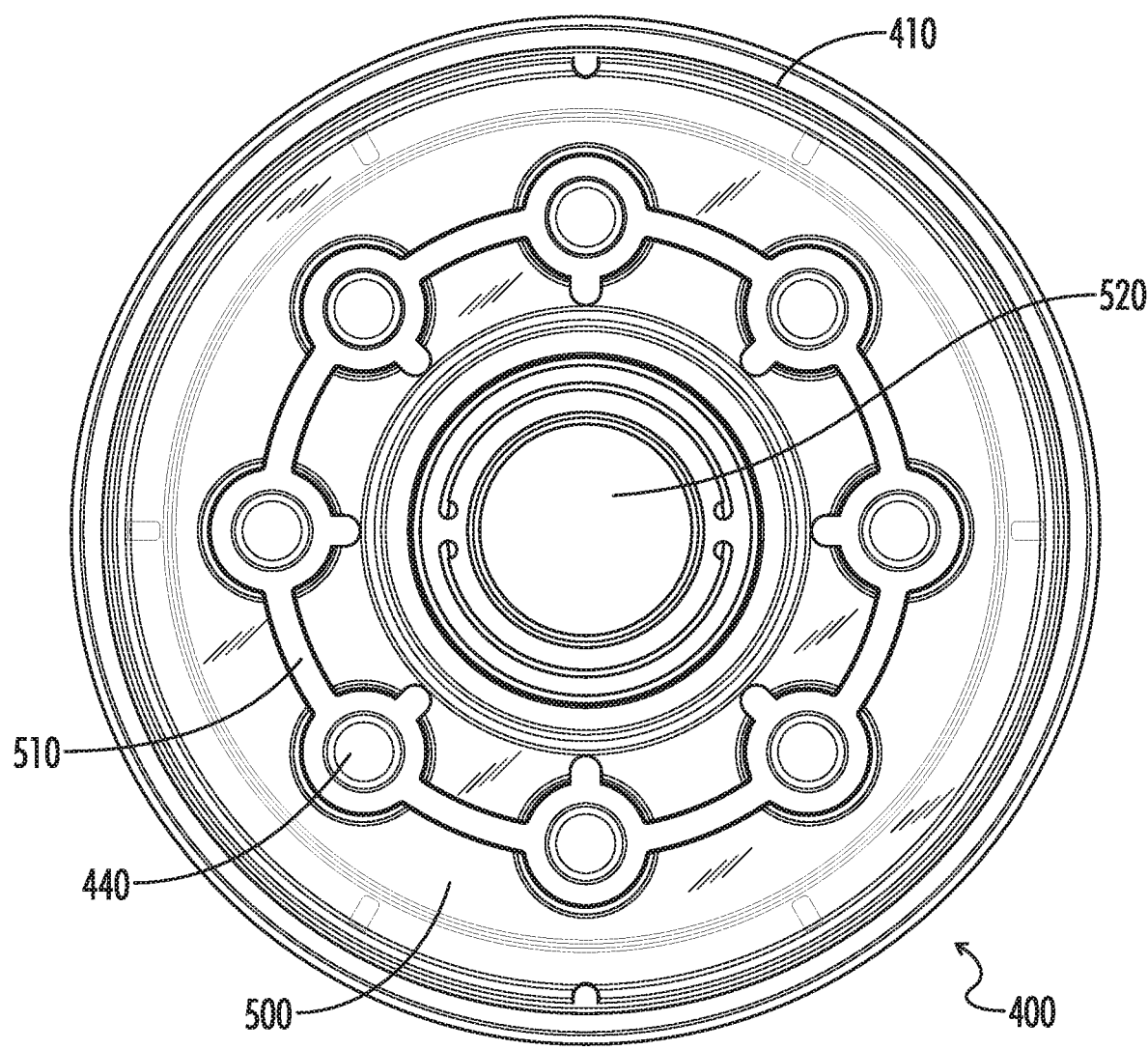
FIG. 5 illustrates a bottom view of an exemplary embodiment of a breather according to aspects of the present disclosure.

FIG. 5 illustrates a bottom view of an exemplary embodiment of a breather according to aspects of the present disclosure. The breather 400 may include a base ring 500 at a bottom portion thereof. The base ring 500 may form part of the breather 400 and/or may be separately coupleable in various embodiments. The base ring 500 may include at least one vent plug 440 configured to correspond to at least one first opening of the housing 400. A plurality of vent plugs 440 may be coupled to one another via at least one connector 510. In various embodiments, a size, shape, and/or geometry of at least one vent plug 440 and/or connector 510 may be provided according to a particular design or operating parameter associated with the breather 400 and/or a reservoir to which the breather 400 is coupleable. The valve ring size, shape, and/or geometry may be used to provide noise elimination and/or airflow optimization. In the embodiment illustrated by FIG. 5, a standpipe plug 520 may be selectively coupled to the second opening 116. The standpipe plug 520 may be used to block at least a portion of the second opening 116 and may be removeable, either in whole or in part.

Figure 6:
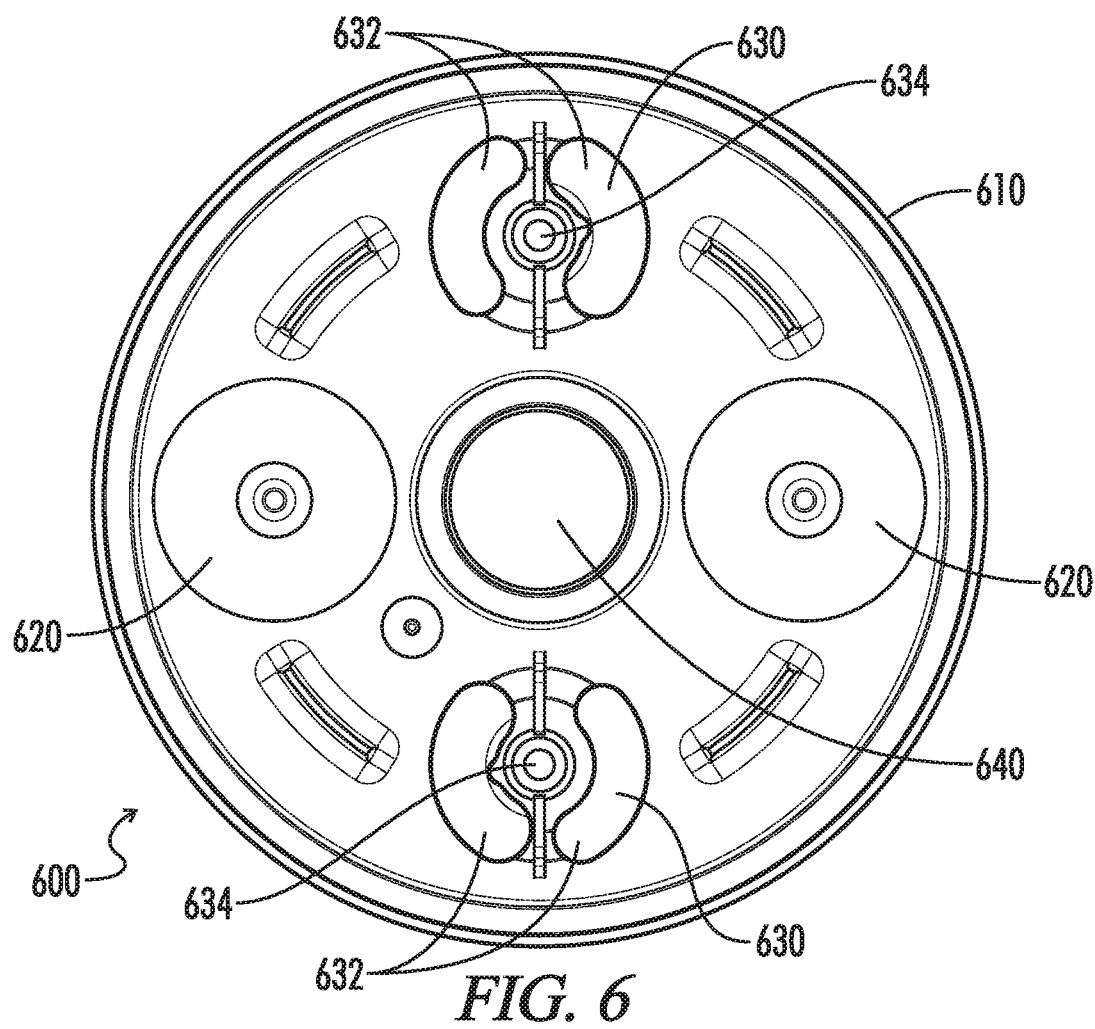
FIG. 6 illustrates a bottom view of an exemplary embodiment of a base ring of the breather housing according to aspects of the present disclosure.

FIG. 6 illustrates a bottom view of an exemplary embodiment of a base ring according to aspects of the present disclosure. The base ring 600 or a portion thereof may be coupleable inside a breather 100, 400, 800, for example between the base ring 500 and the desiccant 118. A filter (e.g., bottom foam filter 160 and/or particulate filter 164) may optionally be configured to be placed either above the base ring 600 or below the base ring 600 in various embodiments. The base ring 600 may include at least one valve 620, 630. The base ring 600 may be configured to connect with at least one valve 620, 630 in a first or second configuration. For the purposes of discussion herein, the valves 620, 630 may be identical in at least one aspect of shape and/or configuration but are not limited to such. The valve 620 illustrated by FIG. 6 may be viewed as a first configuration, whereby a flat face of the valve 620 faces outwardly from the exterior of the base ring 600 relative a breather 100, 400, 800 to which the base ring 600 is connectable. The valve 620 may be configured to permit air to selectively pass between an interior portion of the breather 100, 400, 800 and outside the reservoir. The valve 630 may be viewed as a second configuration and may be configured to permit air to selectively pass between outside of the breather 100, 400, 800 and an interior portion of the breather 100, 400, 800. The valve 630 may be configured alongside the base ring 600 such that at least one passageway 632 is formed to permit airflow between the interior of the breather 100, 400, 800 and external to the breather 100, 400, 800. Although two passageways 632 are illustrated for each valve 630 in FIG. 6 it should be appreciated that a single or a plurality of passageways 632 may be used without departing from the spirit and scope of the present disclosure. The valve 630 may include a notch 634 configured to restrict movement of the valve 630 relative to the base ring 600. At least a portion of an outer surface of the base ring 600 may be flared or provide an outer radius larger than at least a portion of the breather 100, 400, 800 to expand a distance outward from the breather 100, 400, 800 at which any water or moisture might drip from the breather 100, 400, 800.

Figure 7:
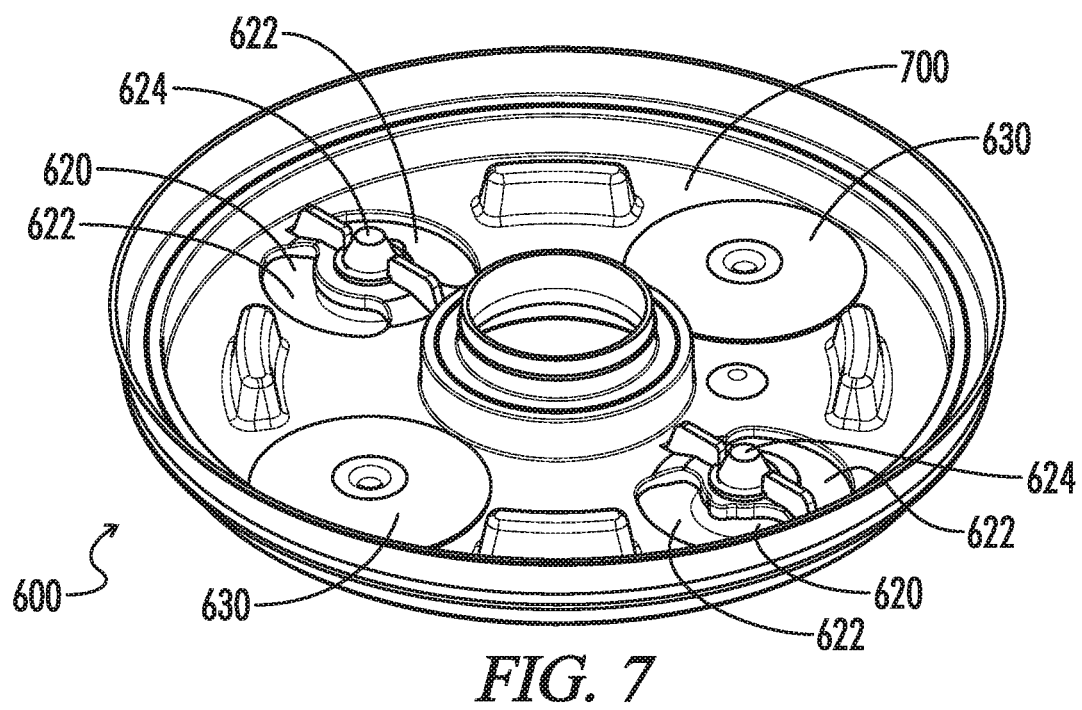
FIG. 7 illustrates a raised perspective view of a base ring of the breather housing of FIG. 6 according to aspects of the present disclosure.

FIG. 7 illustrates a raised perspective view of a base ring of FIG. 6 according to aspects of the present disclosure. The interior portion 700 of the base ring 600 may include one or more valves 620, 630. Each valve 620, 630 may be provided in a first configuration or a second configuration and previously described with reference to FIG. 6. The valve 620 illustrated by FIG. 6 may be viewed as a first configuration, whereby a flat face of the valve 620 faces outwardly from the exterior of the base ring 600 relative a breather 100, 400, 800 to which the base ring 600 is connectable. The valves 630 illustrated by FIG. 7 may be viewed as a second configuration with a flat face of the valves 630 facing inwardly towards an interior portion of the housing 112, 410 of the breather 100, 400, 800. The valve 620 may be configured to permit air to selectively pass between an interior portion of the breather 100, 400, 800 and outside the reservoir, for example via at least one first opening 430. The valve 620 may be configured alongside the base ring 600 such that at least one passageway 622 is formed to permit airflow between the interior of the breather 100, 400, 800 and external to the breather 100, 400, 800 (e.g., via at least one first opening 430). Although two passageways 622 are illustrated for each valve 620 in FIG. 7 it should be appreciated that a single or a plurality of passageways 622 may be used without departing from the spirit and scope of the present disclosure. The valve 620 may include a notch 624 configured to restrict movement of the valve 620 relative to the base ring 600.

Figure 8:
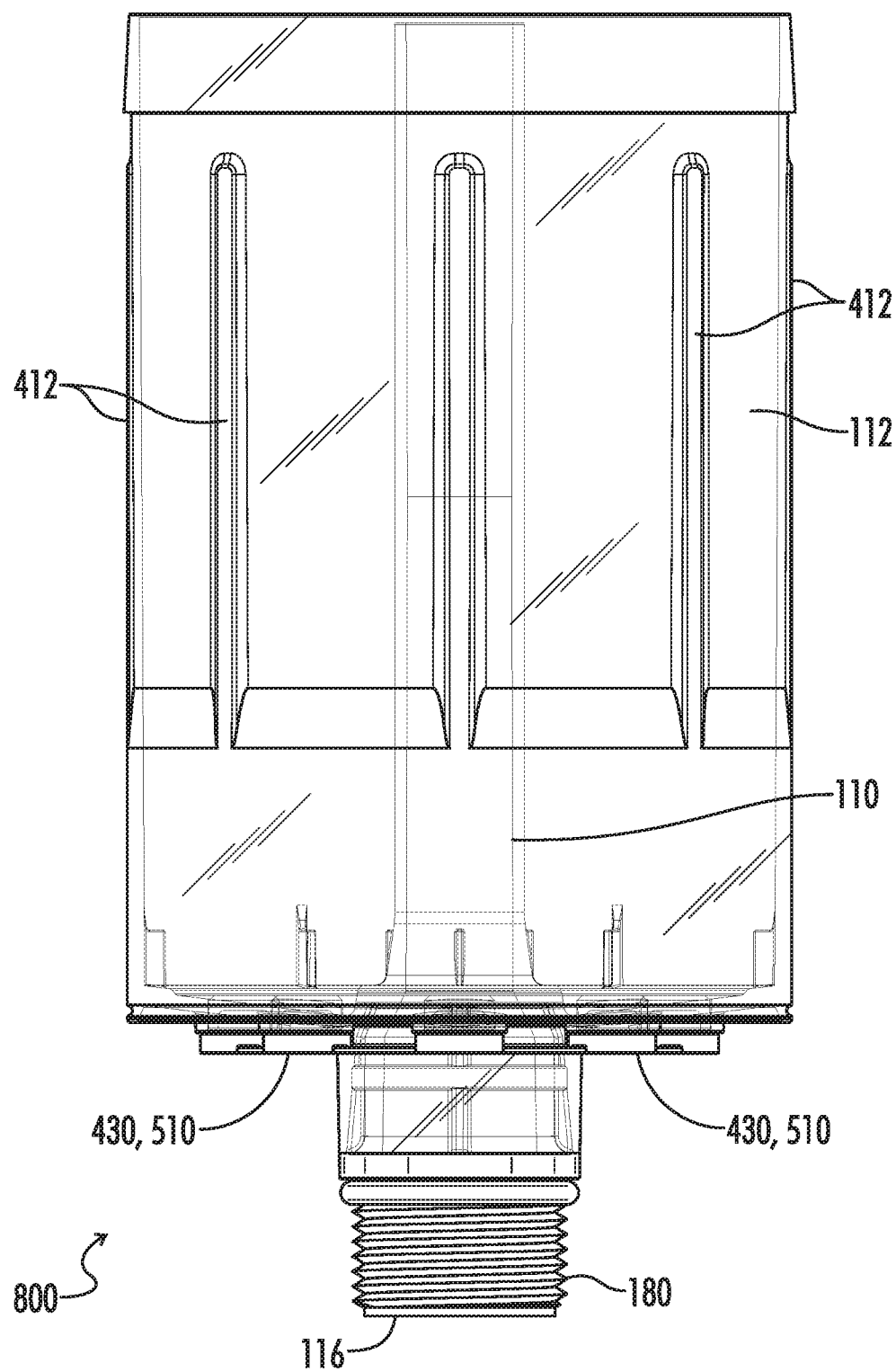
FIG. 8 illustrates a partial front view of an exemplary embodiment of a breather according to aspects of the present disclosure.

FIG. 8 illustrates a partial front view of an exemplary embodiment of a breather according to aspects of the present disclosure. The breather 800 includes a housing 112, 410 optionally having at least one rib 412. At least a portion of a standpipe 110 may be configured to pass through at least a portion of an interior space of the housing 112, 410. In various embodiments, a ratio of the longitudinal length of a housing 112, 410 to a length of the standpipe 110 may be predetermined, determined, and/or adjustable, for example by selecting standpipe 110 having an appropriate size, a housing 112, 410 sized appropriately to a standpipe 110, and/or providing at least one of a standpipe 110 and/or housing 112, 410 having an adjustable size. A ratio of a size or length of the housing 112, 410 to the standpipe 110 may be selected or otherwise implemented to provide optimized airflow conditions within the breather 100, 400, 800. A second opening 116 and threaded section 180 be located at a base of the breather 800. At least one first opening 430 may be provided at a base ring of the breather 800, and may optionally be filled, either in whole or in part, with at least a portion of a vent plug 440.

Figure 9:
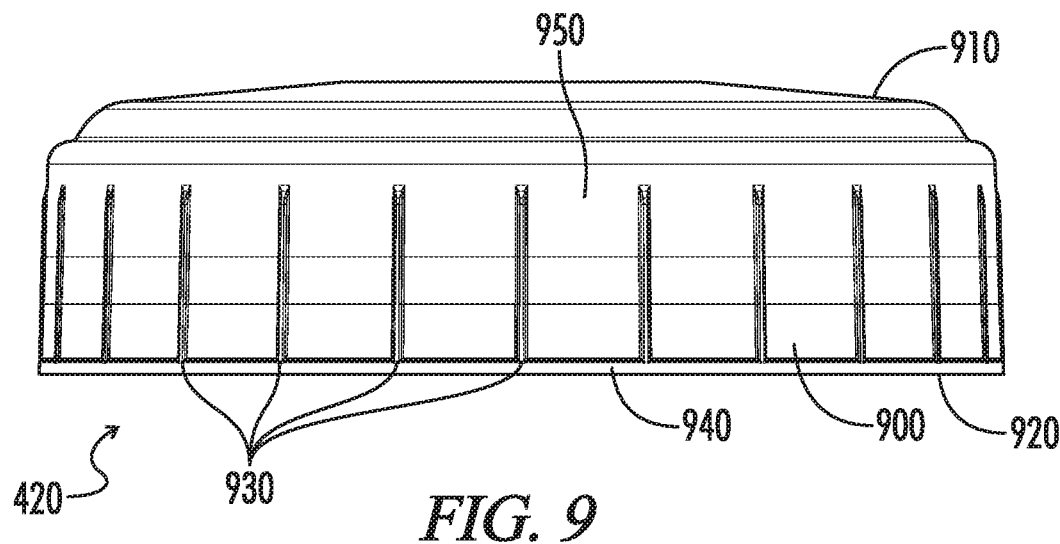
FIG. 9 illustrates a front view of an exemplary embodiment of a cap according to aspects of the present disclosure.

FIG. 9 illustrates a front view of an exemplary embodiment of a cap according to aspects of the present disclosure. The cap 420 includes a body 910 having a connecting end 920 and an enclosing end 950. As noted above, in various embodiments, the cap 420 may be removably coupleable to the breather 100, 400, 800, for example via a valley at an interior portion of the cap 420 with a lip or other external surface of the housing of the breather 100, 400, 800. The connecting end 920 may include at least one rib 930. The rib 930 may be configured to provide a gripping surface, for example for use in placing, replacing, or adjusting a cap 420 and/or breather 100, 400, 800. A lip 940 be positioned at an exterior surface of the cap 420. At least one of the lip 940 and/or rib 930 may be used, for example, to remove excess moisture away from the housing 112, 410 of the breather 100, 400, 800 in various embodiments. At least a portion of the enclosing end 950 may form a domed shape at an exterior surface thereof. The domed surface may be configured to provide structural integrity to the cap 420 and/or breather 100, 400, 800, may be used to promote air flow within the breather 100, 400, 800, and may provide more efficient water run off at a surface thereof relative to a non-domed surface.

Figure 10:
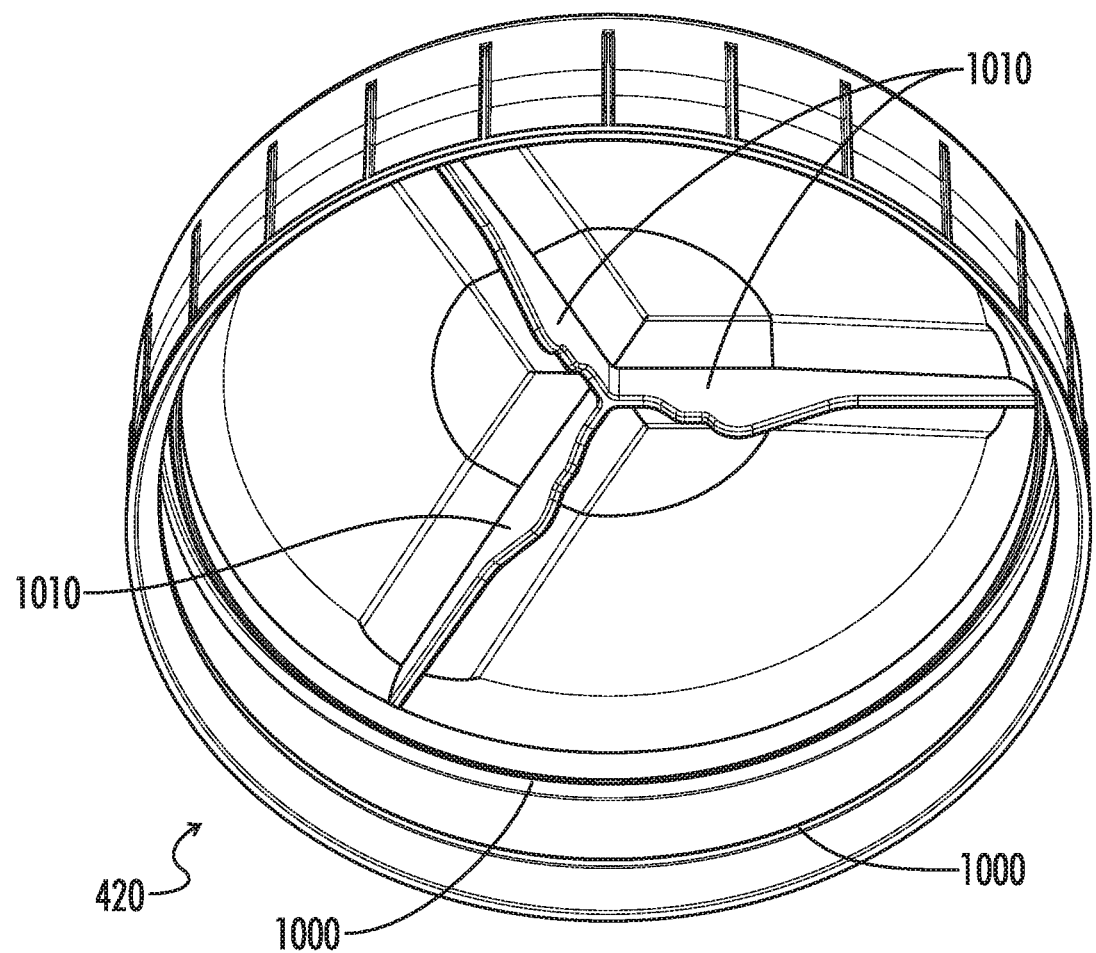
FIG. 10 illustrates a lower right perspective view of a cap according to aspects of the present disclosure.

FIG. 10 illustrates a lower right perspective view of a cap according to aspects of the present disclosure. The cap 420 includes at least one valley 1000 at an interior portion thereof. At least a portion of one valley 1000 may be configured to correspond to a lip at a top portion of the housing 112, 410 to form a seal when placed in contact. The cap 420 may also include at least one standoff 1010. At least one standoff 1010 may be configured to function as a spacer between the cap 420 and the breather 100, 400, 800, may be configured to increase structural integrity of at least a portion of the cap 420, and/or may be used to direct airflow within the cap 420 and/or at least a portion of the breather 100, 400, 800.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful DIAGNOSTIC BREATHER DRYER it is not intended that such references be construed as limitations upon the scope of this invention except as set forth in the following claims.

What is claimed is:

1. A breather for a reservoir, said breather comprising:
  a housing including a plurality of valves, the plurality of valves including (i) at least one valve in a first configuration configured to permit fluid communication from an interior portion of the housing with air outride the reservoir, and (ii) at least one valve in a second configuration configured to permit air to selectively pass between outside the breather and an interior portion of the breather;
  a plurality of first openings in the housing configured to be in fluid communication with air outside of the reservoir;
  a second opening of the housing configured to be in fluid communication with air inside the reservoir; and
  desiccant positioned within the housing, wherein the housing comprises a plurality of vent plugs configured to be coupleable to at least one of the plurality of valves.

2. The breather of claim 1, wherein at least two of the plurality of vent plugs are coupled to one another by at least one connector.

3. The breather of claim 1, wherein the housing includes at least one valve coupled to at least one of the plurality of first openings.

4. The breather of claim 1, wherein the housing includes a plurality of valves, the plurality of valves including at least one valve in the first configuration configured to permit fluid communication from an interior portion of the housing with air outside of the reservoir.

5. The breather of claim 1, wherein the housing includes a plurality of valves, the plurality of valves including at least one valve in the second configuration configured to permit air to selectively pass between outside the breather and an interior portion of the breather.

6. The breather of claim 1, further including:
   a humidity sensor positioned within the housing, wherein the humidity sensor is operable to provide a humidity signal indicative of a humidity level adjacent to the humidity sensor; and
   a controller communicatively coupled to the humidity sensor, wherein the controller is operable to determine an end of life condition of the breather based at least in part upon the humidity signal.

7. The breather of claim 1, wherein the housing comprises a plurality of ribs extending outwardly from the housing.

8. The breather of claim 1, wherein the breather comprises a cap including a valley therein configured to correspond to a lip at a top portion of the housing to form a seal when placed in contact.

9. The breather of claim 8, wherein the cap includes a domed exterior surface.

10. A breather for a reservoir, said breather comprising:
   a housing;
   desiccant portioned within the housing;
   a plurality of first openings in the housing configured to be in fluid communication with air outside of the reservoir;
   a second opening of the housing configured to be in fluid communication with air inside the reservoir;
   a first humidity sensor positioned within the housing and associated with the desiccant, wherein the first humidity sensor is operable to provide a first humidity signal indicative of a first humidity level adjacent the first humidity sensor;
   a second humidity sensor positioned within the housing, wherein the second humidity sensor is operable to provide a second humidity signal indicative of a second humidity level adjacent the second humidity sensor;
   a controller communicatively coupled to the first humidity sensor and the second humidity sensor, wherein the controller is operable to determine an end of life condition of the breather based at least in part upon the first humidity signal received from the first humidity sensor and the second humidity signal received from the second humidity sensor; and
   a display configured to display an indication of the end of life condition, wherein the housing includes a plurality of valves coupled to one another using a connector, the plurality of valves including at least one valve in a second configuration configured to permit air to selectively pass between outside the breather and an interior portion of the breather.

* * * * *